(12) United States Patent
Lykomitros et al.

(10) Patent No.: US 8,394,437 B2
(45) Date of Patent: Mar. 12, 2013

(54) METHOD FOR MAKING A COATED FOOD PRODUCT HAVING A HEAT SUSCEPTIBLE COATING

(75) Inventors: Dimitris Lykomitros, Dallas, TX (US); Kevin O'Sullivan, Frisco, TX (US); V. N. Mohan Rao, Plano, TX (US); Barbara Vazquez Del Mercado, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 992 days.

(21) Appl. No.: 12/021,959

(22) Filed: Jan. 29, 2008

(65) Prior Publication Data

US 2009/0191313 A1 Jul. 30, 2009

(51) Int. Cl.
*A23G 3/00* (2006.01)
*A23L 1/00* (2006.01)

(52) U.S. Cl. .................................... 426/93; 426/303

(58) Field of Classification Search .................. 426/93, 426/94, 102, 303, 304, 305
See application file for complete search history.

(56) References Cited

U.S. PATENT DOCUMENTS

| 4,308,289 A | | 12/1981 | Huisman et al. | |
|---|---|---|---|---|
| 4,738,865 A | | 4/1988 | Morris | |
| 5,149,562 A | * | 9/1992 | Hebert et al. | 426/632 |
| 5,194,278 A | * | 3/1993 | Strong | 426/293 |
| 5,362,505 A | | 11/1994 | Hsieh et al. | |
| 5,585,135 A | | 12/1996 | Patterson et al. | |
| 5,798,132 A | * | 8/1998 | Chen et al. | 426/305 |
| 6,551,643 B2 | * | 4/2003 | Bernatz et al. | 426/516 |
| 6,558,718 B1 | | 5/2003 | Evenson et al. | |
| 6,783,783 B2 | | 8/2004 | Clark et al. | |
| 2003/0082282 A1 | | 5/2003 | Krochta et al. | |
| 2006/0134285 A1 | | 6/2006 | Schnieber et al. | |

FOREIGN PATENT DOCUMENTS

| EP | 0169319 | 4/1993 |
|---|---|---|
| EP | 0684773 | 9/1994 |
| EP | 0527153 | 7/1996 |
| EP | 1585395 | 2/2004 |
| EP | 1550378 | 7/2005 |
| NL | 1026332 | 6/2004 |
| RU | 2001585 C1 | 10/1993 |

(Continued)

OTHER PUBLICATIONS

A.P. Nehaev et al., "Food Chemistry", Published by GIORD (Saint-Petersburg) 2001, pp. 446-447 Translation provided by Baker & McKenzie—CIS, Limited, Moscow, Russia.

*Primary Examiner* — D. Lawrence Tarazano
*Assistant Examiner* — Katherine Deguire
(74) *Attorney, Agent, or Firm* — Colin P. Cahoon; Celina M. Orr; Carstens & Cahoon, LLP

(57) ABSTRACT

A method for making a coated food product having a heat susceptible coating is disclosed. In one aspect, the invention is directed towards a nut having a proteinaceous or fruit-based coating with no visible scorching in the outer, visible coating layer. In one aspect, the food center is par-coated with or without a heat susceptible coating, pre-roasted, finished coated with or without a heat susceptible coating, and cooked. In another aspect, the food center is first coated with a heat susceptible coating, then coated with a non-heat susceptible coating and cooked. In yet another aspect, the food center is coated with a heat susceptible coating and then cooked in a two-stage process whereby the first stage is at a hotter temperature than the second stage.

29 Claims, 1 Drawing Sheet

FOREIGN PATENT DOCUMENTS

| | | |
|---|---|---|
| RU | 2109458 C1 | 4/1998 |
| WO | WO9512990 | 5/1995 |
| WO | WO02091864 | 11/2002 |
| WO | 2006098613 | 9/2006 |

* cited by examiner

METHOD FOR MAKING A COATED FOOD PRODUCT HAVING A HEAT SUSCEPTIBLE COATING

BACKGROUND OF THE INVENTION

1. Technical Field

The present invention relates to a method for making a coated food product having a heat susceptible coating, and more specifically to a coated food center having a proteinaceous or fruit-based coating.

2. Description of Related Art

Coated nut-based foods are typically made from a process known as panning. Panning is the stacking of layers of one material onto another. Panning one food product with another food product is well known in the art. Typically a nut or fruit is placed in a batch tumbler and is coated with a slurry. Next a solid is introduced into the tumbler. The solid adheres to the slurry, forming a layer. Then more slurry is added followed by subsequent solids. More layers are added by repeating the process of adding slurry and then adding solids.

Today many candy manufacturers employ panning to produce a variety of products. For example, panning is used with hard sugar to produce jawbreakers, and jelly beans are produced with soft sugar panning.

Panning has likewise been widely used in the nut industry. Manufacturers use panning to add coatings to nuts and fruits that deliver indulgent flavors and textures. One method of panning is hot panning which produces pralines and French nuts. Another method is chocolate panning which results in chocolate covered fruits or nuts. Finally, many manufacturers employ starch panning wherein a starch/flour mixture is used to coat the nuts. The nuts are then usually subsequently fried.

Nuts and fruit-based snack foods are desired by many consumers because many consumers tend to choose snack foods which are considered healthier and/or more natural. While many food products have centers, such as nuts, that many consumers deem to be natural and healthy, many covered nut products are coated with ingredients that some consumers may deem as highly processed and/or unhealthy, such as chocolate. Consequently, a need exists for a coated food product having a coating that is deemed to be healthier than prior art coatings.

One problem with using healthier coatings, such as coatings having relatively high levels of protein, is that the cooking required to eliminate the beany flavor of the underlying center, such as a peanut, scorches the protein-based coating. To remove the beany flavor, many nuts must be cooked for a long period of time to a moisture content of less than about 2% by weight. Consequently, such long cooking time is detrimental to any heat susceptible coating.

One solution to such problem is to add a browning-retarding agent to minimize or reduce such browning. However, such additives are typically undesirable by the same group of consumers who desire healthier, more natural food products.

Another solution to this problem is to par-roast nuts. Thus, peanuts having a native moisture content of about 6% about 7% are par-roasted to a moisture content of 3% to 4% instead of being fully cooked to a moisture content of less than 2% by weight. Such solution, however, results in the peanut splitting into two pieces, and such par-roasting has resulted in up to 51% of the par-roasted peanuts being split. Such splitting is undesirable because a successful panning operation is dependent upon geometric uniformity of the center. Split peanuts have both a flat surface along the split, and a round surface. Consequently, in the case of peanuts, the presence of splits can cause a variety of problems, including non-uniform cooking and baking, center agglomeration, and/or poor appearance. Many nuts, such as peanuts, require a sufficient cooking time to eliminate the raw and/or beany flavor. Further, because the peanuts are still not completely cooked in a par roasting scenario, any heat-sensitive coating will still scorch when the peanuts are cooked to a finished moisture content. Consequently, a need exists for a coated food product and method for making the same that comprises a coating that is made from a healthier, heat-susceptible coating. Further, it is desirable to have a coated food product comprising a proteinaceous or fruit-based coating. In one embodiment, the coated food product having the heat susceptible coating is made without the use of anti-browning agents or additives.

SUMMARY OF THE INVENTION

The present invention, in one embodiment, is directed towards a method for making a coated food product, said method comprising the steps of panning a food center with a heat-susceptible coating to make a coated food center and cooking said coated food center to reduce the food center moisture content. In one aspect, the invention comprises two panning steps with an intermediate par-roasting step. In one aspect, the invention applies a relatively large percentage of the heat susceptible coatings in the first few cycles of a panning operation. In one aspect, the invention comprises a multi-stage oven drying profile to prevent scorching of the heat susceptible coating.

Other aspects, embodiments and features of the invention will become apparent from the following detailed description of the invention when considered in conjunction with the accompanying drawings. For purposes of clarity, not every component of each embodiment of the invention is shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
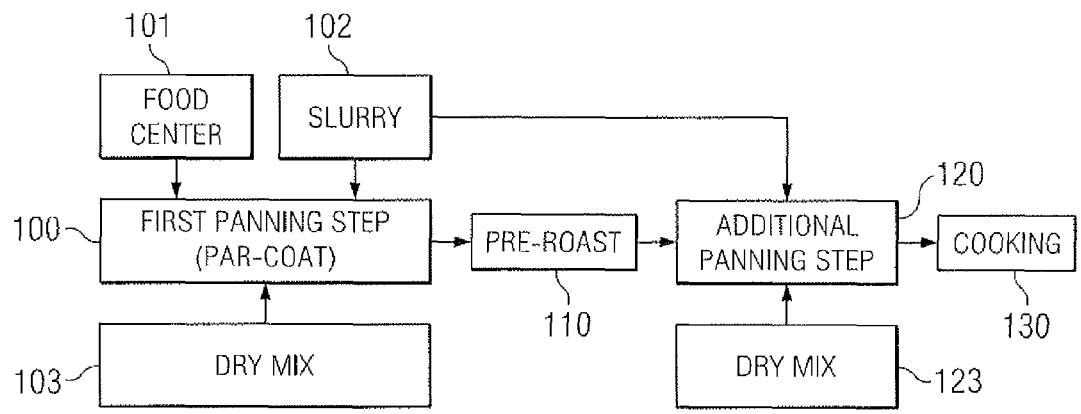
FIG. 1 is a schematic representation of one embodiment of the present invention.

FIG. 1 is a schematic representation of one embodiment of the present invention. As shown, FIG. 1 begins with a first panning step 100. Panning procedures are well known in the art. The first ingredient added to the first panning step is the food center 101. As used herein, a food center refers to a food product, such as a nut, seed, candy, or intermediate- to low-moisture fruit or vegetable. As used herein, an intermediate- to low-moisture fruit or vegetable is defined as a food product having a moisture content of less than about 20% by weight and/or to a food product having a water activity ("Aw") of between about 0.25 and 0.85 prior to the first panning step. Unless stated otherwise, all percentages are deemed to be weight percentages. Suitable nuts can include, but are not limited to, almonds, Brazil nuts, macadamia nuts, peanuts, pecans, walnuts, pistachios, dried chickpeas, and cashews. Those skilled in the art will recognize the other food products, such as sunflower seed kernels, can be used in accordance with the present invention.

The food center 101 is cleaned, shelled, de-pitted, etc. as desired. In one embodiment, the food center 101 is prepared as if it were going to be eaten raw. In one embodiment, food centers are optionally coated with a preservative or other treating agent which may serve to prolong the shelf life. Agents, such as anti-microbial agents can also be utilized. The food center 101 can also be coated with a film forming ingredient including, but not limited to, wax, protein, or a hydrocolloid such as gum arabic to prevent moisture or oil migration from the food center to the coating and enhance shelf-life.

Food centers 101 may be of virtually any size. Typically the finished coated product ranges from about one-half of an inch (1.27 cm) in diameter to about three inches (7.62 cm) in diameter, though other diameters are feasible. Accordingly, the food center 101 typically comprises a diameter of about one-quarter of an inch (0.635 cm) to about two inches (5.08 cm) in diameter.

The food centers 101 are added at virtually any temperature to a mixer. In some embodiments, it may be desirable to add food centers 101 at an elevated temperature, but in many embodiments, the food centers 101 are added at ambient temperature. As used herein, a mixer is defined as any piece of equipment which is capable of panning or coating a first food product with a second food product. In one embodiment, the mixer comprises an engrossing tumbler. An engrossing tumbler is similar in operation to a cement mixer. The tumbler mixes its contents as it rotates on a slightly tilted angle, e.g., about 15 degrees. Such tumblers are well known in the art. Typical tumblers handle batches ranging from about 150 pounds to about 220 pounds, but larger or smaller tumblers can also be used. While the tumblers typically operate at ambient conditions, heating or cooling capabilities can be provided. While the mixer has been described as a tumbler, such description is provided for purposes of illustration and not limitation. Any suitable mixing unit known in the art can be employed.

The next ingredient in the first panning step 100 is the slurry 102. The slurry 102 comprises any suitable binder. As used herein, a binder is a binding agent which is sufficiently sticky to adhere two solids together. Many different binders can be successfully employed in the slurry 102 including sugar-based solutions. Such solutions are well known in the art and can comprise 40% sucrose and 60% water. In one embodiment, the sugar based solution comprises sugars selected from honey, brown sugar, sucrose, rice syrup, corn syrup, and mixtures thereof. The slurry 102 can also include other carbohydrates including, but not limited to, dextrose, maltose, palatinose, xylitol, lactitol, and combinations thereof. These materials can also be blended with panning modifiers including, but not limited to, gum arabic, maltodextrins, corn syrup, gelatin, cellulose-type materials, such as carboxymethylcellulose or hydroxymethyl-cellulose, starch and modified starches, vegetable gums, such as alginates, locust-bean gum, guar gum, and gum tragacanth, insoluble carbonates like calcium carbonate or magnesium carbonate and talc.

Once the slurry 102 composition has been selected and formulated, it can be heated to a temperature of about 150° F. (65° C.) to about 170° F. (77° C.). The primary purpose for heating the slurry 102 is to ensure sugars are dissolved and are microbiologically safe. The lower viscosity as a result of the heating step is desirable as the slurry 102 is to be used to adhere a dry mix 103 to the food center 101.

The next ingredient used in the first panning step 100 is the dry mix 103. The dry mix 103 comprises a variety of ingredients including starch-based ingredients. The dry mix 103 can include, but is not limited to, flour, sugar, waxy starch, corn bran, modified food starch, salt, and baking powder. The dry mix 103 can also comprise whole grain flours which are flours containing all of the essential and naturally-occurring nutrients of the entire grain, including, for example, the germ bran and endosperm fractions. Multigrain flours can be used in the dry mix 103 as well.

In one embodiment, the dry mix 103 comprises a heat-susceptible ingredient. In an alternative embodiment, the slurry 102 used in the first panning step 100 comprises a heat susceptible ingredient. As used herein, a heat-susceptible ingredient is an ingredient that is susceptible to browning or caramelization upon heat and includes ingredients having fruit-based ingredients and proteinaceous ingredients. For example, proteinaceous ingredients can burn or excessively brown when the proteinaceous ingredients achieve temperatures above the Maillard reaction temperature for a period of time. The rate of the browning reaction is dependent upon a number of factors including the concentration of the reactants, water activity, oxygen supply, temperature, pH, and the nature of the ingredient.

As used herein, proteinaceous ingredients are protein concentrates and isolates including, but not limited to, soy concentrate, soy isolate, whey protein isolate, whey protein concentrate, milk proteins, whey protein hydrolysates, casein, gelatin, legume protein isolates, egg albumin or egg white, wheat protein concentrate, legume protein concentrates and mixtures thereof. Examples of milk proteins include whey, caseinate and milk concentrates and isolates. Protein concentrates typically comprise at least 65% protein by weight, and protein isolates typically comprise 90% protein by weight.

As used herein, fruit-based ingredients are ingredients having a dextrose equivalent (D.E.) of at least about 40, preferably about 50-70 and more preferably about 55-65, and a soluble solids content of at least 5% by weight. As those in the art understand, reducing sugars from fruit-based ingredients can brown via a caramelization reaction. Fruit-based ingredients in the form of fruit-based powders can be used in the dry mix.

As used herein, a heat susceptible coating is a coating made from a dry mix or slurry wherein the dry mix and/or the slurry comprises between about 3% and 100% by weight of a heat susceptible ingredient. More preferably a proteinaceous ingredient such as a protein isolate comprises between about 3% and about 10% and most preferably about 3% to about 6% by weight of the dry mix or slurry. In one embodiment, a fruit-based ingredient comprises up to about 100% of the dry mix and/or the slurry and more preferably between about 80% and about 90% by weight.

As used herein, a non-heat susceptible dry mix is defined as a blend of dry ingredients not susceptible to heat. Examples of a non-heat susceptible dry mix include, but are not limited, cereal flours and food starches.

After the food center 101, slurry 102, and dry mix 103 has been prepared, the first panning step 100 can begin. First, a volume of slurry 102 is fed into the tumbler. The slurry 102 can be introduced in a variety of ways. In one embodiment, the slurry 102 is simply poured or pumped into the tumbler. In an alternative embodiment, the slurry 102 is sprayed into the tumbler. The volume of slurry 102 added depends upon the size of the vessel, the desired batch size of the tumbler, the ratio of slurry 102 to dry mix 103, the number of layers desired, as well as other factors.

The application of the slurry 102 and dry mix 103 onto the food center 101 in a tumbler results in a par-coated center. In one embodiment, par-coating is complete when a thin layer of dough has been applied to the food center 101 surface. In one embodiment, the par-coated center comprises a dough and the dough comprises about 10% to about 15% by weight of the total par-coated center prior to pre-roasting 110. In one embodiment, a par-coated center occurs when at least about 80% of the available surface area on the food center 101 is covered by the resultant dough from the slurry 102 and the dry mix 103. The time necessary to complete par-coating is dependent upon several factors, such as product geometry, adhesiveness of the slurry, the application method, etc.

The volume of the slurry 102 and the dry mix 103 added is dependent upon the number of cycles desired. A single cycle is defined herein as the addition of a slurry (e.g., slurry 102) followed by the addition of a solid ingredient (e.g., dry mix 103). The number of cycles is related to, among other factors, the desired amount and thickness of the layers. For example, if it is desired that the food center be coated with a thin layer, then only a few cycles are employed. In one embodiment, the par-coated center is made in five or fewer cycles. The layer or layers of resultant coating from the first panning step 100 are collectively referred to as the inner layer.

In one embodiment, the par-coated center is then pre-roasted 110 to a food center moisture content of about 3% to about 4% by weight. The food center moisture content is the moisture content of the food center 101. It excludes the moisture content of the coating applied via the slurry 102 and the dry mix 103. In one embodiment, a nut-based par-coated food product can be pre-roasted at a temperature of between about 270° F. and about 325° F. to the desired food center moisture content. Such temperature range is provided for purposes of illustration and not limitation. Other food centers 101 can be pre-roasted at other time-temperature profiles. Because the par-coating is relatively thin, the thin coat acts as a poor insulator and does not retard the heating of the underlying food center 101. Further, because the pre-roasted food products will be subsequently covered in additional panning steps 120, the browning of the inner coat, if the inner coat comprises a heat susceptible coating, is not a concern. Consequently, the use of heat-susceptible coatings can be employed in the first panning step 100 without the consequence of negative visual browning or scorching. Further, because the partial coat or par-coat has been formed, even if the food center splits during the pre-roasting step 110, the dried coating keeps the geometric integrity of the par-coated centers intact. Thus, because of the geometric uniformity provided by the par-coating, additional panning steps 120 can be successfully performed without the problems usually associated with splits.

Following the pre-roasting step 110, par-coated food products can then undergo additional panning steps 120. Again, the dry mix 123 and slurry 102 are added in such a manner that sufficient slurry 102 is present to adhere the dry mix 123 onto the pre-roasted food product.

In one embodiment, the dry mix 123 accounts for about 15% to about 35% of the product before baking or frying in a cooking step 130. The slurry 102 is mixed and heated to a temperature of about 150° F. to about 170° F. The tumbler's contents are then mixed for a time sufficient to reach complete coating. The layer or layers of the slurry 102 coated onto the pre-roasted food product are collectively referred to as the outer layers.

In one embodiment, the dry mix 123 comprises a non-heat susceptible dry mix and is added after the heat susceptible dry mix 103. A dry mix 123 and/or inclusions can then be added to the tumbler where the pre-roasted food center, dry mix 123, and slurry 102 are permitted to mix. The additional panning step 120 occurs for the desired number of cycles. In one embodiment, the number of cycles ranges from about 1 to about 25, more preferably from about 5 to about 15, and most preferably about 10. Consequently, the outer layer comprised of the non-heat susceptible dry mix 123 is adhered on top of the inner layers comprised of the heat susceptible dry mix 103. Following the additional panning steps 120 the coated food product can be cooked in a cooking step 130. The final cooking step 130 can include frying, baking, or other suitable cooking step.

In one embodiment, the coated food product is cooked 130 at an oven temperature of between about 220° F. to about 330° F. for a period of time ranging from about 15 minutes to about 1 hour, and more preferably about 25 minutes to about 45 minutes. During and after baking 130 the coated food products typically lose between about 5% to about 25% by weight water. In one embodiment, following a cooking step 130 the food center 101 comprises a moisture content of less than 3% by weight.

Advantageously, the pre-roasted center will require minimal cook 130 via a baking or frying step, which minimizes or eliminates visual scorching of the outer layer, even if the outer layer comprises heat susceptible ingredients. For example, in one embodiment a pre-roasted center is baked at an oven temperature of between about 250° F. to about 350° F. for between about 5 minutes and about 30 minutes to a fully cooked food center moisture content of less than 2%. In one embodiment, the pre-roasted center is fried in hot oil having a temperature of between about 300° F. to about 400° F. for between about 20 seconds and about 180 seconds to a fully cooked food center moisture content of less than 2%.

It should be noted that various embodiments of the present invention are possible within the spirit and scope of the claimed invention. For example, the heat susceptible ingredients can be added in the first dry mix 103, second dry mix 123, the slurry 102, and during one or more coats of a first panning step 100 or additional panning steps 120.

In an actual process using an embodiment of the invention described above, a peanut was used as a food center 101 and a heat susceptible dry mix 103 was admixed with a sugar-based slurry 102 in a single cycle to create a par-coated food center 100. The par-coated food center 100 was then pre-roasted in an oven having an oven temperature of about 290° F. for 30 minutes. An outer coating was then applied with nine additional cycles of a heat susceptible dry mix 123 and slurry 102. The coated food product was baked in an oven having an oven temperature of 300° F. for 10 minutes. There was no visible scorching on the outside of the coated food product and the nut center was fully cooked and had no beany flavor.

As used herein, scorching is defined as excessive Maillard reaction products or caramelization products that produce compounds that cause brown color and/or burnt flavors. One objective way of measuring burnt/bitter notes is to measure pyrazine and/or furan levels in a food product. A food product having a concentration of greater than about 2 ppm of pyrazines and/or furans exhibits a burnt/bitter note and for purposes of this invention is considered a scorched food product.

Figure 2:
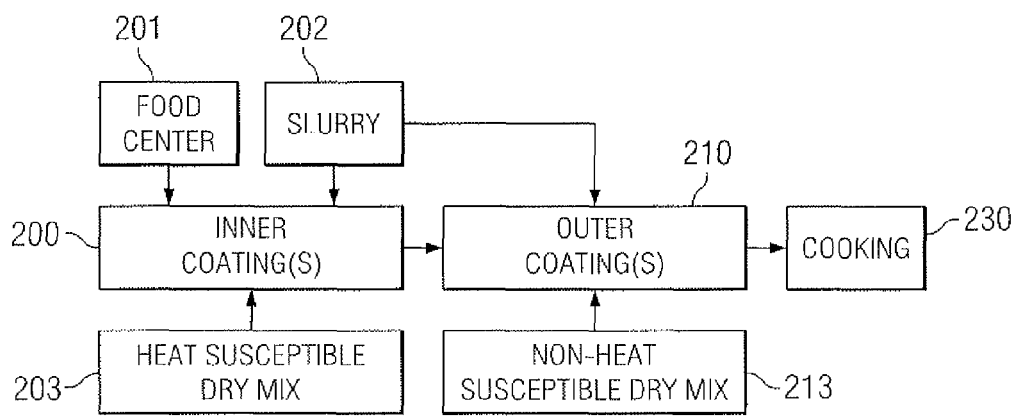
FIG. 2 is a schematic representation of one embodiment of the present invention.

FIG. 2 is a schematic representation of an alternative embodiment of the present invention. In one embodiment, a heat susceptible inner coating 200 is applied to the food center 201. To make the heat susceptible coating, at least about 50%, more preferably about 70% and most preferably about 90% of the total heat susceptible ingredients added to the food center are added within the first four cycles, more preferably in the first three cycles, and in one embodiment in the first one or two cycles. In one embodiment, 100% of the heat susceptible ingredients 203 are added within the first three cycles. Additional coatings 210 can then be provided with a non-heat susceptible dry mix 213. Adding most or all of the heat susceptible ingredients 203 such as protein rich components in the first few cycles results in an inner coating having a relatively high protein content and an outer surface comprising an outer coating 210 having a relatively low concentration of heat susceptible ingredients. Consequently, the outer surface is less likely to brown or scorch during the subsequent cooking step 230. In such embodiment, because of the lack of heat susceptible ingredients on the outer surface, the outer surface will not scorch with extended cooking times. Consequently, in such embodiments, the pre-roasting step 10 (depicted in FIG. 1) can be avoided. Although FIG. 2 depicts the origin of the heat susceptible ingredients as emanating from the dry mix 203, the heat susceptible coating can be applied as the inner coating 200 via the dry mix 203, the slurry 202 or combinations thereof.

In an actual process using an embodiment of the invention described above, a peanut was used as a food center 201 and whey protein isolate comprising 6% of the heat susceptible dry mix 203 was admixed with a sugar-based slurry 202 in a single cycle to create a monolayered inner heat susceptible coating 200. An outer coating 210 was then applied with nine additional panning cycles of non heat susceptible dry mix 213 and slurry 202. The coated food product was baked 230 in an oven having an oven temperature of 290° F. for 40 minutes. There was no visible scorching on the outside of the coated food product and the nut center was fully cooked and had no beany flavor. They whey protein isolate contributed between 7% and 8% of the protein in the finished coated food product.

Figure 3:
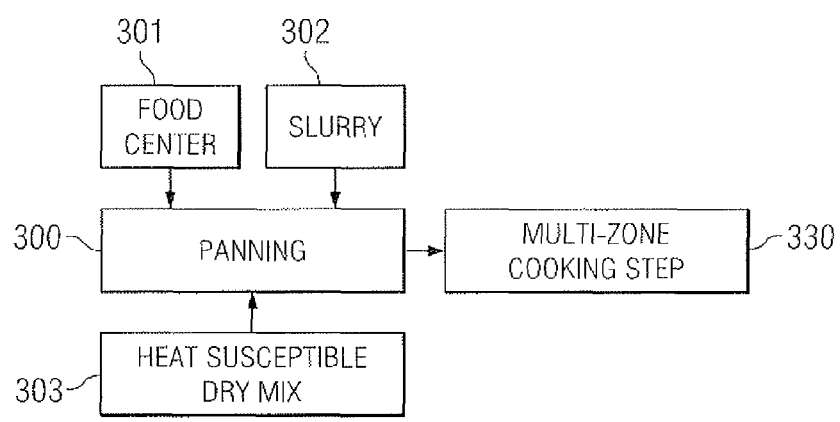
FIG. 3 is a schematic representation of one embodiment of the present invention.

FIG. 3 is a schematic representation of one embodiment of the present invention. In one embodiment, the cooking step 330 is achieved with a multi-zone oven profile comprising a first zone having an oven air temperature of between about 290° F. to about 330° F. to reduce the food center moisture content to about 4% to about 7% by weight and a second zone having an oven temperature of less than about 280° F. to reduce the food center moisture to less than about 3% by weight, and preferably to a moisture content of about 1% to about 2% by weight. While the exact time and temperature profile for each zone can depend upon the actual oven being used and the actual composition of the food center, the objective is to sufficiently cook the center 301 without scorching or burning of the outer, visible layer via the heat susceptible coating, whether such coating is applied as an inner coating or as an outer coating in a panning step 300. Consequently, in one embodiment, the first cooking zone can occur at oven temperatures higher than the Maillard reaction temperatures and the second zone can occur at oven temperatures that are just above or below the Maillard reaction temperatures. Moisture loss typically prevents the food product temperature from achieving the oven temperature. For example, the Maillard reaction typically occurs at food temperatures between about 250° F. to 260° F. Consequently, in one embodiment of the present invention, the second zone comprises an oven temperature of between about 220° F. to 280° F. In one embodiment of the present invention, the coated food product is dehydrated to a food center moisture content of about 4% to about 7% in a first zone, and to a food center moisture content of about 1.5% to about 3% in a second zone wherein the second zone comprises an oven temperature of between about 220° F. to about 280° F.

In one embodiment, the first cooking zone can occur at oven temperatures higher than the caramelization reaction temperatures and the second zone can occur at oven temperatures that are just above or below the caramelization reaction temperatures. For example, the caramelization reaction, caused by the oxidation of reducing sugars, typically occurs at temperatures above about 310° F. In one embodiment of the present invention, the second zone comprises an oven temperature of between about 220° F. to 330° F. and more preferably below about 310° F. Consequently, in one embodiment of the present invention, the coated food product is dehydrated to a food center moisture content of about 4% to about 7% in a first zone, and to a food center moisture content of about 1.5% to about 3% in a second zone wherein the second zone comprises an oven temperature of between about 220° F. to about 330° F.

As shown in FIG. 3, the multi-zone cooking step 330 can be used after panning 300 of the food center 301 with no par-coating or pre-roasting steps. Consequently, in one embodiment of the present invention, a food product is panned with multiple coats with a heat-susceptible coating in a single panning step 300 to make a coated nut, and the coated nut is cooked in the two-stage oven profile 330 described above.

In an actual process using an embodiment of the invention described above, a peanut was used as a food center 301 and a heat susceptible dry mix 303 was admixed with a sugar-based slurry 302 in a panning step 300 for 10 cycles. The coated food center 100 was then baked in a two-stage process 300. The coated food center was first baked at 300° F. for 18 minutes and then at 250° F. for 18 minutes. There was no visible scorching on the outside of the coated food product and the nut center was fully cooked and had no beany flavor.

Unless otherwise indicated, all numbers expressing quantities of ingredients, properties, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings aye by way of example only.

What is claimed is:

1. A method for making a coated food product, said method comprising the sequential steps of:
   a) par coating a food center with a dough such that said dough comprises between about 10% to about 15% of a par-coated food product;
   pre-roasting said par-coated food product to a food center moisture content of between about 3% and about 4% by weight;
   b) panning the par-coated food product with a heat-susceptible coating to make a coated food product; and
   c) cooking said coated food product to a food center moisture content of less than about 3% by weight.

2. The method of claim 1 wherein said food product comprises one or more nuts selected from almonds, Brazil nuts, macadamia nuts, peanuts, pecans, walnuts, pistachios, dried chickpeas, and cashews.

3. The method of claim 1 wherein said food center at step a) comprises a moisture content of less than about 7% by weight.

4. The method of claim 1 wherein said food product at step a) comprises a dried food product having an $A_w$ of between about 0.25 and about 0.85.

5. The method of claim 1 wherein said heat susceptible coating comprises proteinaceous ingredients.

6. The method of claim 1 wherein said heat susceptible coating comprises fruit-based ingredients.

7. The method of claim 1 wherein said par-coating comprises a heat-susceptible coating.

8. The method of claim 1 wherein said cooking at step c) comprises an oven temperature at less than 280° F.

9. The method of claim 8 wherein step c) comprises a two-stage oven profile, wherein said food products are cooked at a first stage oven temperature of between about 290° F. and 330° F. to a food center moisture content of between about 4% by weight and about 7% by weight and a second stage at a temperature less than about 280° F. to a food center moisture content of less than 3% by weight.

10. The method of claim 8 wherein step c) comprises a two-stage oven profile, wherein said food products are cooked at a first stage to a food center moisture content of between about 4% by weight and about 7% by weight and a second stage at a temperature less than about 330° F. to a food center moisture content of less than 3% by weight.

11. The method of claim 1 wherein said panning in step b) comprises first coating with a heat-susceptible coating followed by applying multiple coats of a non heat-susceptible coating.

12. The method of claim 11 wherein said cooking at step c) comprises an oven temperature of between about 250° F. and about 350° F.

13. The method of claim 1 wherein step c) comprises a two-stage oven profile wherein said food products are cooked in a first stage, at a first stage oven temperature of between about 290° F. and about 330° F. to a food center moisture content of between about 4% to about 7% by weight, and in a second stage at a second stage oven temperature less than about 280° F. to a food center moisture content of less than about 3% by weight.

14. A method for making a coated food product, said method comprising the sequential steps of:
    a) providing a food center;
    b) panning the food center with a heat-susceptible coating to make a coated food product wherein said panning comprises first coating with a heat-susceptible coating followed by applying multiple coats of a non heat-susceptible coating; and
    c) cooking said coated food center to a food center moisture content of less than about 3% by weight.

15. The method of claim 14 wherein said coated food product comprises one or more nuts selected from almonds, Brazil nuts, macadamia nuts, peanuts, pecans, walnuts, pistachios, dried chickpeas, and cashews.

16. The method of claim 14 wherein said food center at step a) comprises a moisture content of less than about 7% by weight.

17. The method of claim 14 wherein said food center at step a) comprises a dried food product having an $A_w$ of between about 0.25 and about 0.85.

18. The method of claim 14 wherein said heat susceptible coating comprises proteinaceous ingredients.

19. The method of claim 14 wherein said heat susceptible coating comprises fruit-based ingredients.

20. The method of claim 14 further comprising the steps of:
    par coating said food center with a dough such that said dough comprises between about 10% by weight to about 15% by weight of a par-coated food product; and
    pre-roasting said par-coated food product to a food center moisture content of between about 3% by weight and about 4% by weight.

21. The method of claim 20 wherein said par-coating comprises a heat-susceptible coating.

22. The method of claim 14 wherein said cooking at step c) comprises an oven temperature at less than 280° F.

23. The method of claim 22 wherein step c) comprises a two-stage oven profile, wherein said coated food products are cooked at a first stage oven temperature of between about 290° F. and 330° F. to a food center moisture content of between about 4% by weight and about 7% by weight and a second stage at a temperature less than about 280° F. to a food center moisture content of less than 3% by weight.

24. The method of claim 22 wherein step c) comprises a two-stage oven profile, wherein said food products are cooked at a first stage to a food product moisture content of between about 4% by weight and about 7% by weight and a second stage at a temperature less than about 330° F. to a food center moisture content of less than 3% by weight.

25. The method of claim 14 wherein said panning in step b) comprises first coating with a heat-susceptible coating followed by applying multiple coats of a non heat-susceptible coating.

26. The method of claim 14 wherein said cooking at step c) comprises an oven temperature between about 250° F. and about 350° F.

27. The method of claim 14 wherein step c) comprises a two-stage oven profile wherein said food products are cooked in a first stage, at a first stage oven temperature of between about 290° F. and about 330° F. to a food center moisture content of between about 4% by weight to about 7% by weight, and in a second stage at a second stage oven temperature less than about 280° F. to a food center moisture content of less than about 3% by weight.

28. The method of claim 14 wherein said coated food product comprises a pyrazines and/or furan concentration of less than about 2 ppm after step c).

29. The method of claim 1 wherein said coated food product comprises a pyrazines and/or furan concentration of less than about 2 ppm after step c).

* * * * *